United States Patent
Kaibel et al.

(10) Patent No.: US 6,511,053 B2
(45) Date of Patent: Jan. 28, 2003

(54) PACKING FOR HEAT-EXCHANGE AND MASS-TRANSFER COLUMNS

(75) Inventors: Gerd Kaibel, Lampertheim (DE); Achim Stammer, Mobile, AL (US); Manfred Stroezel, Ilvesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/888,610

(22) Filed: Jun. 26, 2001

(65) Prior Publication Data
US 2002/0003313 A1 Jan. 10, 2002

(30) Foreign Application Priority Data
Jun. 30, 2000 (DE) .......................... 100 31 119

(51) Int. Cl.[7] .................................................. B01F 3/04
(52) U.S. Cl. .............. 261/112.2; 261/113; 261/DIG. 72
(58) Field of Search ................. 261/94, 112.1, 261/112.2, 113, DIG. 72

(56) References Cited

U.S. PATENT DOCUMENTS

| | | | |
|---|---|---|---|
| 2,047,444 A | 7/1936 | Stedman | 261/94 |
| 2,885,195 A | 5/1959 | Haselden | 261/113 |
| 2,983,495 A | 5/1961 | Shuttleworth | 261/112.2 |
| 2,998,234 A | 8/1961 | Haselden | 261/113 |
| 3,013,781 A | 12/1961 | Haselden | 261/112.2 |
| 4,604,247 A | 8/1986 | Chen et al. | 261/112.2 |
| 4,676,934 A | 6/1987 | Seah | 261/112.2 |
| 5,523,062 A | 6/1996 | Hearn et al. | 261/112.2 |
| 5,554,329 A | 9/1996 | Monkelbaan et al. | 261/113 |

FOREIGN PATENT DOCUMENTS

| | | | |
|---|---|---|---|
| DE | 744183 | 11/1943 | 261/113 |
| DE | 2262838 | 7/1973 | 261/112.2 |
| DE | 196 05 286 | 8/1997 | |
| SU | 342040 | 6/1972 | 261/112.2 |
| WO | WO 98/50752 | 11/1998 | |

OTHER PUBLICATIONS

Sattler "Themische Trennverfahren" (1988).
"Strukturierte Packungen für Destillation und Absorption" Sulzer Chemtech.
"MellapakPlus Eine neue Generation strukturierter Packungen" Sulzer Chemtech.

*Primary Examiner*—C. Scott Bushey
(74) *Attorney, Agent, or Firm*—Keil & Weinkauf

(57) ABSTRACT

The invention relates to a packing sheet having straight-line kinks which divide the packing sheet into kink areas which have a width a, measured from kink edge to kink edge, and passage apertures, where a proportion X of at least 60% of the passage apertures has a separation b of at most 0.4 a from a kink edge.

12 Claims, 4 Drawing Sheets

PACKING FOR HEAT-EXCHANGE AND MASS-TRANSFER COLUMNS

The invention relates to packing sheets designed with a cross-channel structure, and to packing for heat exchange and mass transfer between a liquid and a gas in a column containing such packing sheets.

In the distillative work-up of product mixtures, the best results are generally achieved in so-called countercurrent distillation, also known as rectification, i.e. a distillation process in which the liquid flows from top to bottom and the vapor from bottom to top in the column, with the lower-boiling components accumulating in the vapor and the higher-boiling components in the liquid.

This mass and heat transport is increased by elements built into the column, such as column trays, packing elements or structured packing, which ensure an adequate contact time of the phases and a sufficiently large phase interface. However, these column internals and the down-flowing reflux associated therewith give rise to a flow resistance for the vapor in the column, known as the pressure loss. For a given column geometry, i.e. diameter and column height, the pressure loss of the column depends very heavily on the type of column internals in addition to the type and amount of compounds to be rectified.

For the separation of substance mixtures which require high separation performance, use is made of rectification columns with internals comprising stacked metal structures. These packings, which have a systematic structure in a regular geometry with defined passage zones for the countercurrent phases, are distinguished by higher loading capacity, better separation action and a lower specific pressure loss compared with all other internals. They are therefore employed in all vacuum rectifications in which, owing to the heat sensitivity of the mixture to be separated, restriction of the column pressure loss is particularly important. In the case of structured packing, physical shapes with a cross-channel structure which consist of metal sheets, expanded metal or wire meshes have proven particularly successful, for example metal mesh packing of the BX and CY type from Sulzer A G, CH-8404 Winterthur (cf. company publication "Trennkolonnen für Destillation und Absorption" [Separating Columns for Distillation and Absorption] from Sulzer A G) and metal mesh packings with a similar action from other manufacturers, for example Montz-Pak type A3, BSH or B1 from Montz GmbH, D-40723 Hilden.

A diagrammatic representation of such columns is given, for example, on page 103 of the reference book "Thermische Trennverfahren" [Thermal Separation Methods] by K. Sattler, VCH Verlagsges mbH, Weinheim (Germany), 1988. For further details of the rectification of substance mixtures, we refer to this reference book by Klaus Sattler, pages 101–225, in particular 120–160 and 199–214.

In these packings with a cross-channel structure, the starting material is usually additionally provided with passage apertures, for example with circular holes having a diameter of from about 4 to 6 mm, in order to raise the flooding point of the packing and to facilitate higher column loading.

In this connection, the term flooding point is taken to mean the gas or liquid volume per time and cross-sectional area in which the downflowing liquid builds up in or above the bed to complete overflow or is entrained by the gas stream. Exceeding of this load results in a rapid reduction in the separation efficiency and a steep increase in the pressure loss (details in "Thermische Trennverfahren" [Thermal Separation Methods] by K. Sattler, VCH Verlagsges mbH, Weinheim (Germany) 2nd Edition, 1995, pp. 240 ff.).

The passage apertures are uniformly distributed over the packing sheet.

The angle which the kinked areas (referred to as kink areas below) form to one another, referred to below as the kink angle ($\gamma$), is usually from about 60° to 90°. Structured packing with packing sheets having a smaller kink angle is rather unusual. An exception is formed by WO 98/50752, which describes structured packing with packing sheets which have a smaller kink angle of less than 67°.

The packings are combined to form individual beds with a depth of from about 0.15 to 0.25 m. Each bed is built up from a multiplicity of individual layers of kinked sheets, expanded metals or meshes, with the kinks in most designs running in straight lines and usually being inclined at an angle of from 30 to 45° to the vertical, i.e. to the column axis. DE-A 196 05 286 describes a special development of packings for use in the separation of particularly heat-sensitive substances in which this angle is reduced to from 0 to 25°, preferably from 3 to 14°, in order to lower the pressure loss of the packings as far as possible in the case of applications in a high vacuum (head pressure about 1 mbar).

The previously known packings have the disadvantage that the liquid film on the packing sheets becomes unstable even at relatively low liquid loadings. In general, the flooding point is lower the greater the inclination of the kinks to the column axis.

It is therefore an object of the present invention to indicate packings which facilitate a greater inclination of the kinks to the column axis and a higher flooding point in respect of a certain fluid.

We have found that this object is achieved by a packing sheet having straight-line kinks which divide the packing sheet into kink areas which have a width a, measured from kink edge to kink edge, and passage apertures. In the packing sheet according to the invention, a proportion X of at least 60% of the passage apertures has a separation b of at most 0.4 a from the lower kink edge.

Like the packing sheets of the previously described packings, a packing sheet according to the invention has straight-line kinks. These kinks divide the surface of the packing sheet into sub-areas, which are referred to for the purposes of the invention as kink areas. The width of these kink areas, which corresponds to the separation of two adjacent kink edges, i.e. is measured from kink to kink, is denoted by a. Passage apertures are located on the kink areas, and can also bridge kink edges. The passage apertures can have any conceivable geometry, in particular can be designed as circular holes or as slots, slots being preferred. Slots are passage apertures of rectangular or virtually rectangular geometry with a length/width ratio of greater than 1:1, preferably from 5:1 to 1:1, in particular from 4:1 to 2:1, especially from 3:1 to 2:1, but generally less than 10:1. The longer side of the slot preferably runs parallel or essentially parallel (±10°) to the kink edges. The separation of the passage aperture from a kink edge, b, is measured from the point of the passage aperture which has the greatest separation from the kink edge. These passage apertures may be distributed stochastically over the kink area in accordance with the rules according to the invention, in which case the separation b of a passage aperture would then be different in each case. Furthermore, the passage apertures may be arranged in accordance with certain rules—such as equal separation along a spatial direction. At separation b from the kink edge, passage apertures are only provided on one side of the kink edge—the bottom kink edge—and are not provided on the other side of the kink edge. It is furthermore possible for some of the kinks to have no passage apertures. At least 60% of the kinks of a packing sheet, preferably 80%, in particular 90%, especially 100% of the kinks should have passage apertures on one side.

The packing sheet according to the invention differs from the known packing sheets in that a proportion X of at least 60% of the passage apertures has a separation b of at least 0.4 a from a kink edge. X adopts preferred values of at least 70%, 80% or 90%, where, in a particularly preferred embodiment, X is 100%. The separation b is preferably less than or equal to 0.3 a, 0.2 a or 0.1 a; in particular, the separation is about 0.25 a. Preferably, no passage aperture bridges a kink edge.

In a further embodiment of the packing sheet according to the invention, the kink areas form an angle of from 40 to 120°, preferably from 60 to 100°, in particular from 60 to 90°, especially about 90°.

In a further embodiment, the proportion of the area occupied by the passage apertures of a kink area is from 5 to 40%, preferably from 10 to 30%, in particular from 10 to 20%, of this kink area.

In a further embodiment, the passage apertures have a rectangular design with a length/width ratio of from 5:1 to 1:1, preferably from 4:1 to 2:1, in particular from 3:1 to 2:1, the longer side preferably being aligned parallel to the kink edges.

The invention furthermore relates to packings for heat exchange and mass transfer between a liquid and a gas in a column containing packing sheets according to the invention, where the kink edges form an angle (θ) of from 20° to 70°, preferably from 30° to 45°, to the column axis. Furthermore, these packings have a cross-channel structure like the known packings.

The invention is based on the discovery that a liquid flows off the upper side of an inclined surface in a substantially stable manner, while it tends toward instability on the underside in the case of relatively high liquid flow rates. This results in drop formation, which favors premature flooding, i.e. a lowering of the flooding point.

The packing sheets according to the invention preferably have passage apertures in the vicinity of the kink edges. The fluid is preferably passed through these on the upper side of the inclined areas, and the liquid loading on the critical underside is reduced without significant proportions of the fluid, as in known packing sheets, reaching the critical underside through apertures in the middle of the kink areas. It is particularly advantageous here to design the passage apertures as slots, with the longer side preferably running essentially parallel to the kink edges. This is because this facilitates moving the passage apertures close to the kink edges.

Through the use of the packing sheets according to the invention in packings for columns, the flooding point of these columns in relation to a fluid in question can be increased to such an extent that large inclination angles of the kink edges to the column axis of up to about 70° can be achieved without reducing the separation performance in practice. Large inclination angles are desirable in the case of large column diameters owing to the better cross-mixing of the vapor streams.

The invention is described in greater detail below by means of the drawing, in which.

Figure 1:
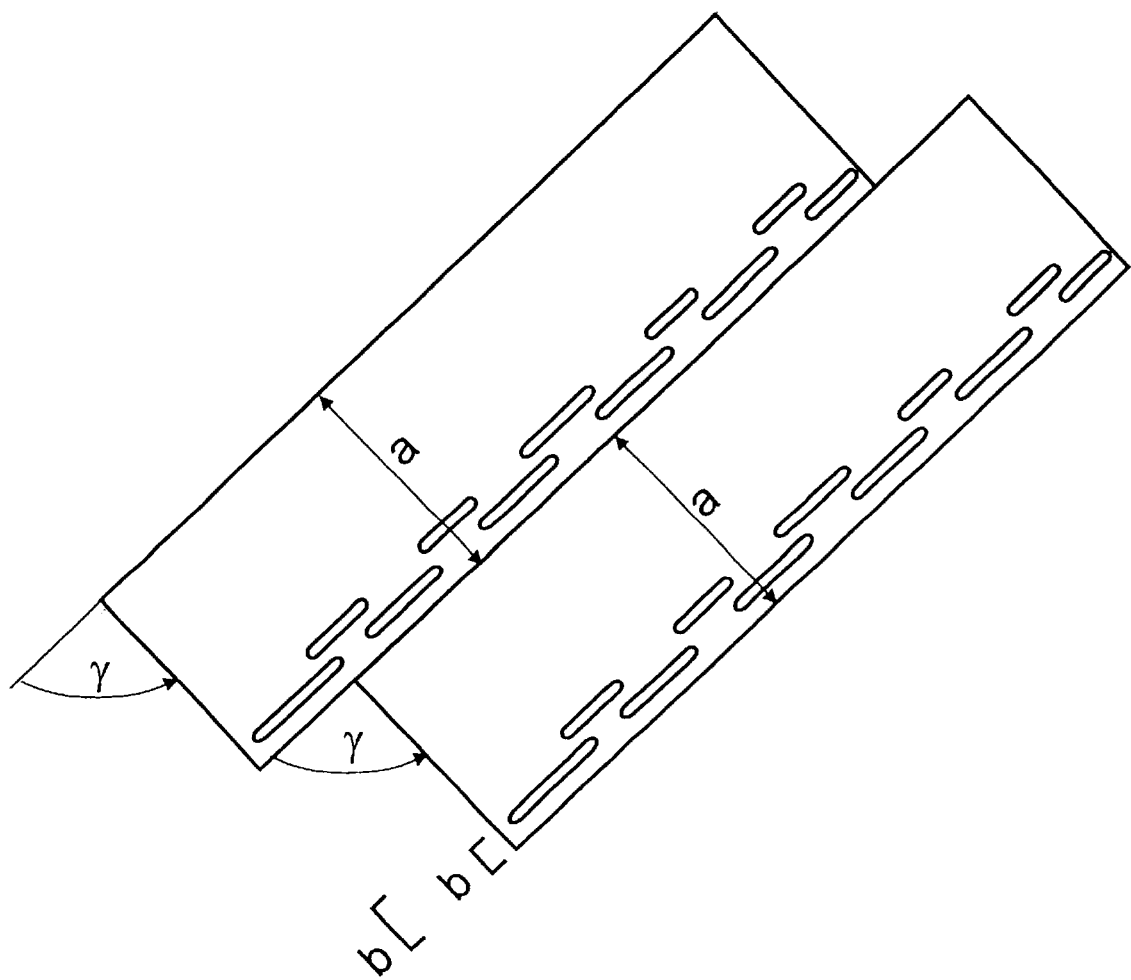
FIG. 1 shows a section of a packing sheet according to the invention.

FIG. 1 illustrates the quantities a, b and γ with reference to a section from a packing sheet according to the invention. γ denotes the kink angle. The passage apertures are designed here as slots, which are designed in the form of two offset rows of slots. The longer side of the slots runs parallel to the kink edges. This is particularly advantageous owing to the flow behavior of the fluids. The passage apertures can, as shown in FIG. 1, also have different separations b from the kink edge.

Figure 2:
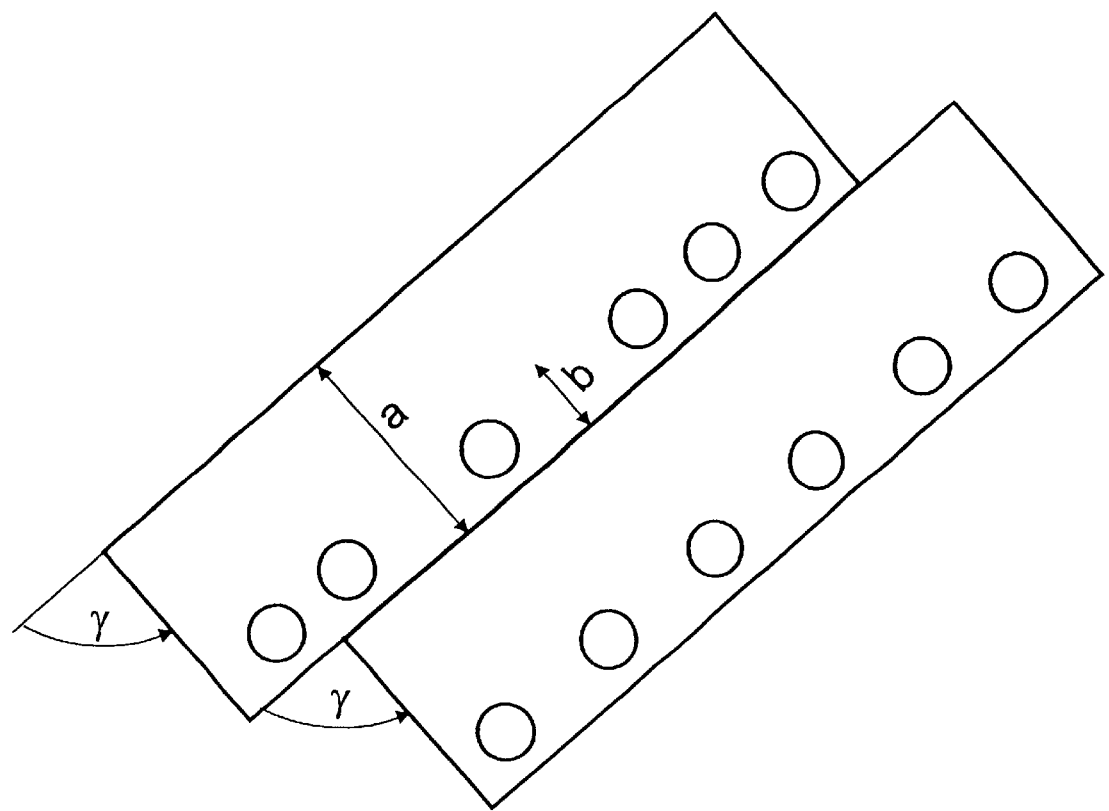
FIG. 2 shows a section of a further packing sheet according to the invention together with a plan view.
Figure 2:
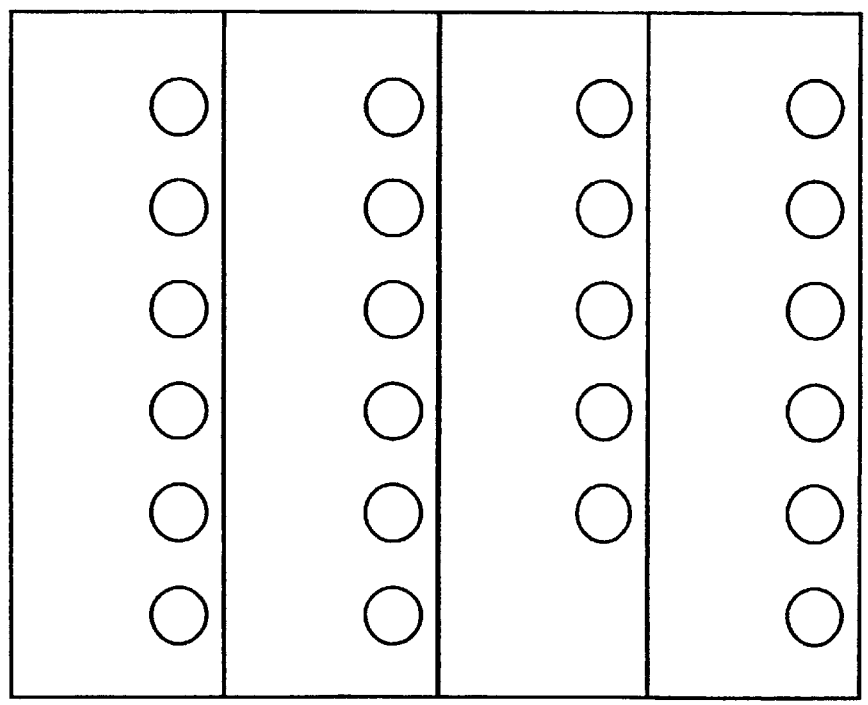

In FIG. 2, the quantities a, b and γ are drawn in as in FIG. 1. The passage apertures are circular and are only on one side of a kink edge.

Figure 3:
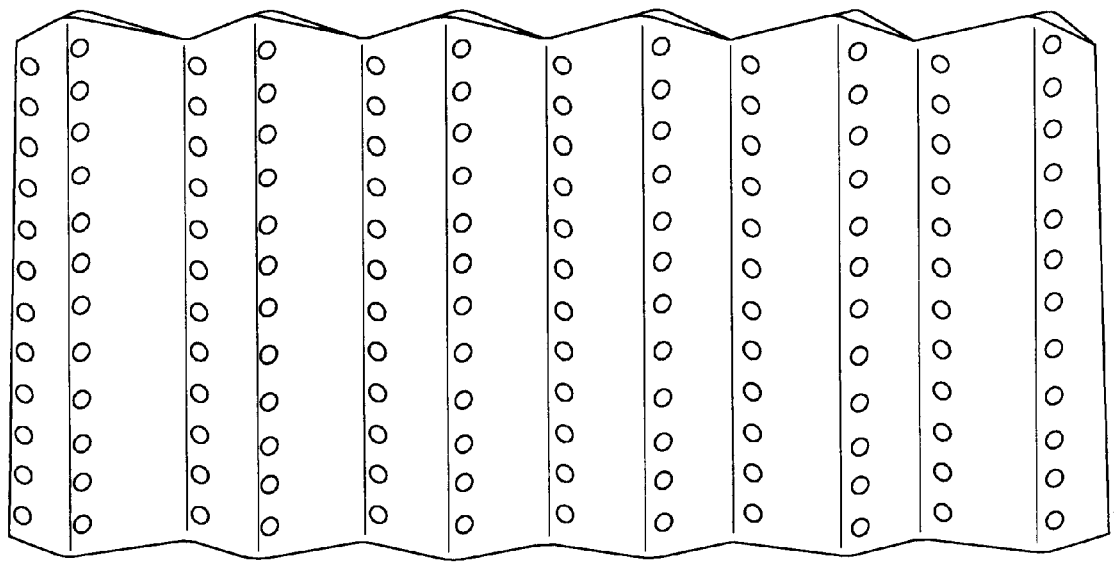
FIG. 3 shows photographs of packing sheets according to the invention.
Figure 4:
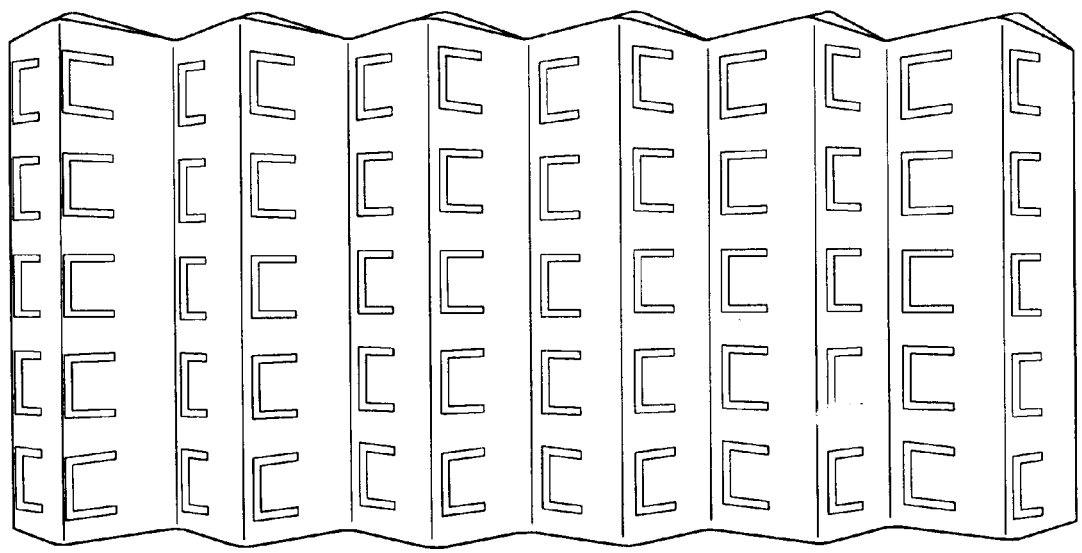
FIG. 4 shows photographs of further packing sheets according to the invention.

FIGS. 3 and 4 show two examples of packing sheets according to the invention.

Figure 5:
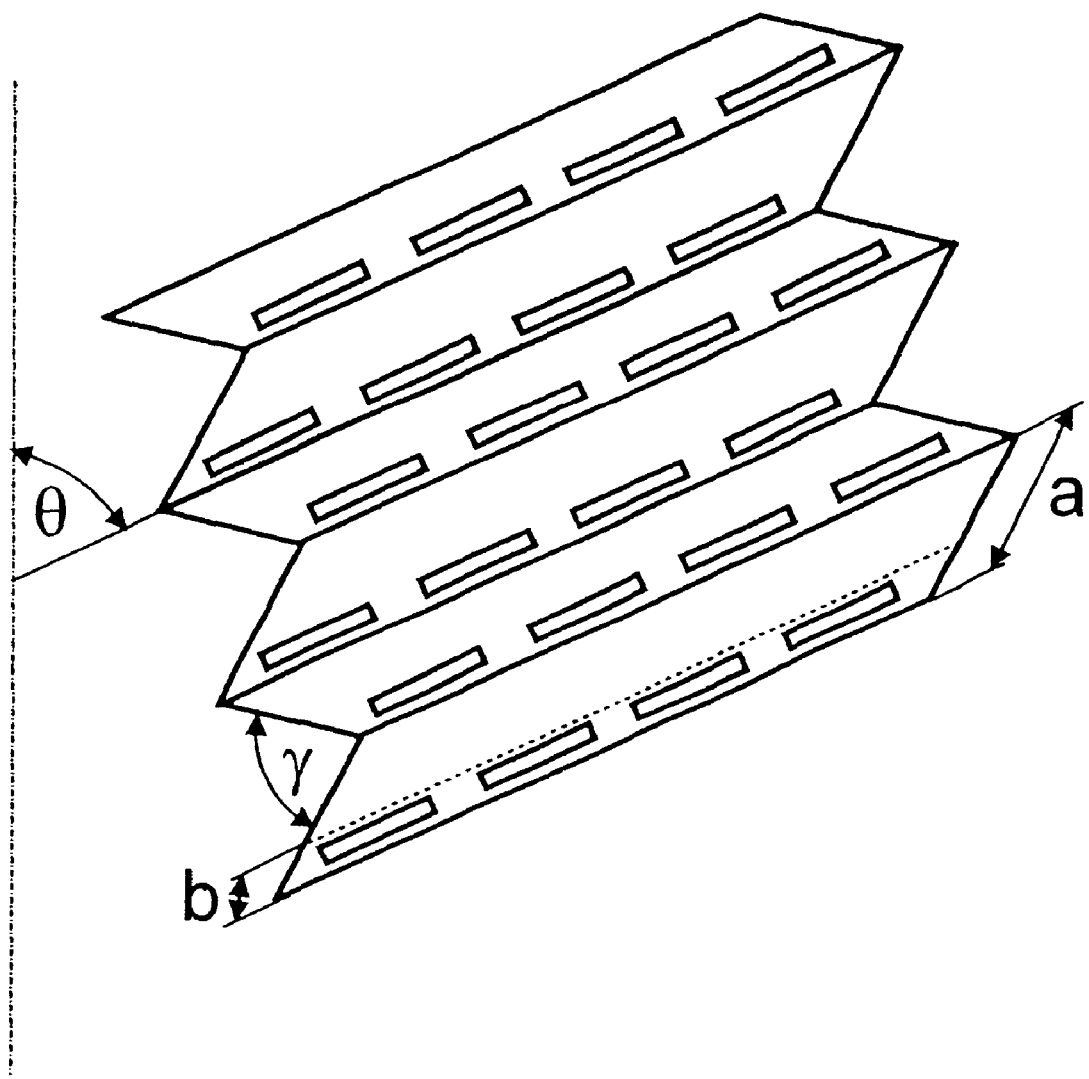
FIG. 5 shows the spatial position of a packing sheet according to the invention.

FIG. 5 shows a sketch of the spatial position of a packing sheet according to the invention. θ denotes the angle which the kink edges form to the column axis.

EXAMPLE 1

FIG. 3 shows a further packing sheet according to the invention. The passage apertures, designed as circular holes, are provided on one side. All passage apertures (X=100%) are located at separation b=0.25 a from the kink edge. The kink edges form an angle of 90°. The passage apertures occupy an area of 15% of the kink area.

EXAMPLE 2

FIG. 4 shows a packing sheet according to the invention. The passage apertures, designed as slots, are perpendicular to the kink edges and are provided on one side. The length/width ratio of the passage apertures is 5:1. All passage apertures (X=100%) are located at separation b=0.4 a from the kink edge. The kink areas form an angle of 90°. The passage apertures occupy an area of 7.5% of the kink area.

We claim:

1. A packing for heat exchange and mass transfer between a liquid and a gas in a column, comprising packing sheets having straight-line kinks which divide the packing sheets into kink areas which have a width a, measured from kink edge to kink edge, wherein the kink edges form an angle of from 20° to 70° to the column axis; and passage apertures, wherein a proportion X of at least 60% of the passage apertures has a separation b of at most 0.4 a from the lower kink edge.

2. The packing as claimed in claim 1, wherein X is at least 80%.

3. The packing as claimed in claim 1, wherein X is at least 90%.

4. The packing as claimed in claim 1, wherein b is at most 0.3 a.

5. The packing as claimed in claim 1, wherein b is at most 0.2 a.

6. The packing as claimed in claim 1, wherein two adjacent kink areas form an angle of from 40° to 120°.

7. The packing as claimed in claim 1, wherein the proportion of the area occupied by the passage apertures in a kink area is from 5 to 40%.

8. The packing as claimed in claim 1, wherein the passage apertures are designed in rectangular form with a length/width ratio of from 5:1 to 1:1, the longer side, if any, being aligned essentially parallel to the kink edges.

9. The packing as claimed in claim 1, wherein the kink edges form an angle of from 30° to 45° to the column axis.

10. The packing as claimed in claim 6, wherein two adjacent kink areas form an angle of from 60° to 90°.

11. The packing as claimed in 7, wherein the proportion of the area occupied by the passage apertures in a kink area is from 10 to 20%.

12. The packing as claimed in claim 8, wherein the passage apertures are designed in rectangular form with a length/width ratio of from 3:1 to 2:1, the longer side being aligned essentially parallel to the kink edges.

* * * * *